(12) United States Patent
Hunn et al.

(10) Patent No.: US 6,644,594 B1
(45) Date of Patent: Nov. 11, 2003

(54) FLIGHT REFUELING GUIDE

(75) Inventors: Bruce P. Hunn, Lancaster, CA (US); James D. Francey, Edwards AFB, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/294,771

(22) Filed: Nov. 12, 2002

(51) Int. Cl.$^7$ ................................................ B64D 15/00
(52) U.S. Cl. ................................ 244/135 R; 244/135 A
(58) Field of Search ......................... 244/135 R, 135 A

(56) References Cited

U.S. PATENT DOCUMENTS 4,158,885 A * 6/1979 Neuberger .................. 701/300
4,398,685 A * 8/1983 Task et al. ............... 244/135 A
4,633,376 A * 12/1986 Newman .................... 362/470
5,499,784 A * 3/1996 Crabere et al. ......... 244/135 A

* cited by examiner

*Primary Examiner*—J. Woodrow Eldred
(74) *Attorney, Agent, or Firm*—Thomas C. Stover

(57) ABSTRACT

In an in-flight refueling system of an aircraft having a recess therein containing a slipway leading to a fuel inlet port, an improvement is provided in the form of a guideway having a) a pair of lead-in lines on the surface of the aircraft which taper and converge towards the slipway and port and b) a plurality of dashes or bars on the surface, spaced longitudinally between the lead-in lines, a desired distance apart, to provide visual cues in aiding an operator in guiding a fuel boom and nozzle from a refueling aircraft to the slipway and port of a fuel receiving aircraft, to provide a visually more salient means to achieve a quick and effective refueling hook-up while avoiding or minimizing nozzle strikes that can damage the aircraft, the boom or its nozzle.

13 Claims, 7 Drawing Sheets

FLIGHT REFUELING GUIDE

STATEMENT OF GOVERNMENT INTEREST

The invention described herein may be manufactured and used by or for the Government for governmental purposes without the payment of any royalty thereon.

RELATED APPLICATIONS

None.

FIELD OF THE INVENTION

This invention relates to an in-flight refueling guide for accurate delivery of fuel from one in-flight craft to another.

BACKGROUND OF THE INVENTION

The task of aerial refueling involves a fuel tanker aircraft and a receiver aircraft flying in close formation under very controlled flight conditions. The task of the refueling boom operator in the tanker is to take a long tubular refueling boom and manipulate it between the aerodynamic slipstreams of both aircraft so that it contacts the refueling receptacle on the receiving aircraft. This boom can move in three dimensions to affect a contact; movement is controlled by the tanker boom-operator. Once in position, the boom nozzle is mechanically linked to the receiver aircraft and the fuel can be transferred. This task is performed by the tanker aircraft boom-operator using controls in the tanker aircraft that allow the operator to fly the fueling boom into position. Manipulating the movement of the boom requires manual skill. It also requires considerable guidance as to the location of the refueling receptacle to create a visual refueling link between the two aircraft. To enhance this visual image for the boom operator, various lead-in line patterns have been used. Earlier lead-in line patterns did not provide very accurate guidance to the boom operator; the consequence was inadvertent boom contacts with aircraft structures other than the refueling port area. By not visually drawing the boom operators eyes toward the target, previous designs allowed connection and acquisition errors to occur. These errors in boom movement would often lead to structural damage to the receiver aircraft.

Examples of prior art lead-in line patterns are shown in FIGS. 4 and 5 hereof, which do not provide adequate directional, distance or rate of closure guidance of the fuel boom and nozzle to the fuel receptacle or port on the fuel-receiving aircraft.

Accordingly, there is need and market for a refueling guide that gives such adequate guidance and otherwise overcomes the above prior art shortcomings.

There has now discovered in-flight refueling system which provides enhanced guidance of a refueling boom in direction and relative motion, as it closes on the fuel port of the fuel receiving aircraft for greatly enhanced in-flight refueling.

SUMMARY OF THE INVENTION

Broadly the invention provides an enhanced in-flight refueling system for an aircraft having a slipway leading to a fuel inlet port in a recess in the aircraft, the improvement comprising, a guideway having, a) a pair of lead-in lines on the surface of the aircraft which converge toward the slipway and port and b) b) a plurality of marks on the surface spaced longitudinally between the lines a desired distance apart, so that the lines and marks aid in guiding a fuel boom and nozzle from a refueling aircraft to the slipway and port.

The refueling guide of the invention can have recess doors which open & close over the recess on hinges and when open, reveal padding over the hinges to protect them from contact with said nozzle.

Definitions:

By "slipway" as used herein, is meant a sloping surface descending from the surface into a recess in an aircraft and leading to a fuel inlet port therefor.

BRIEF DESCRIPTION OF THE DRAWINGS

The invention will become more apparent from the following detailed specification and drawings in which.

DESCRIPTION OF PREFERRED EMBODIMENTS

Figure 1:
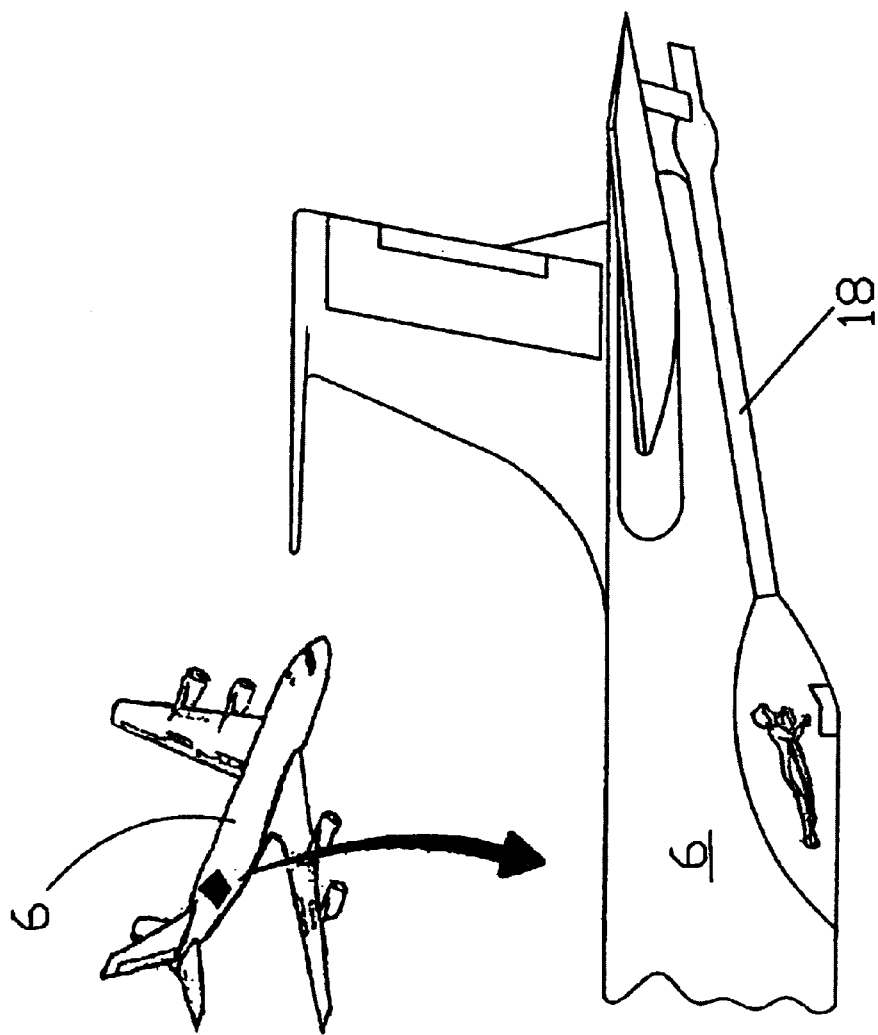
FIG. 1 is a fragmentary perspective schematic view of aircraft refueling components.

Referring now to the drawings, the invention is a collection of design elements applied to the surface of an aircraft, that provides 3-dimensional information to the boom operator of, e.g., a tanker aircraft, by the novel use of several two dimensional principles of perspective. A fueling guide of the invention also incorporates numerous rules of human visual perception as elements.

Figure 2:
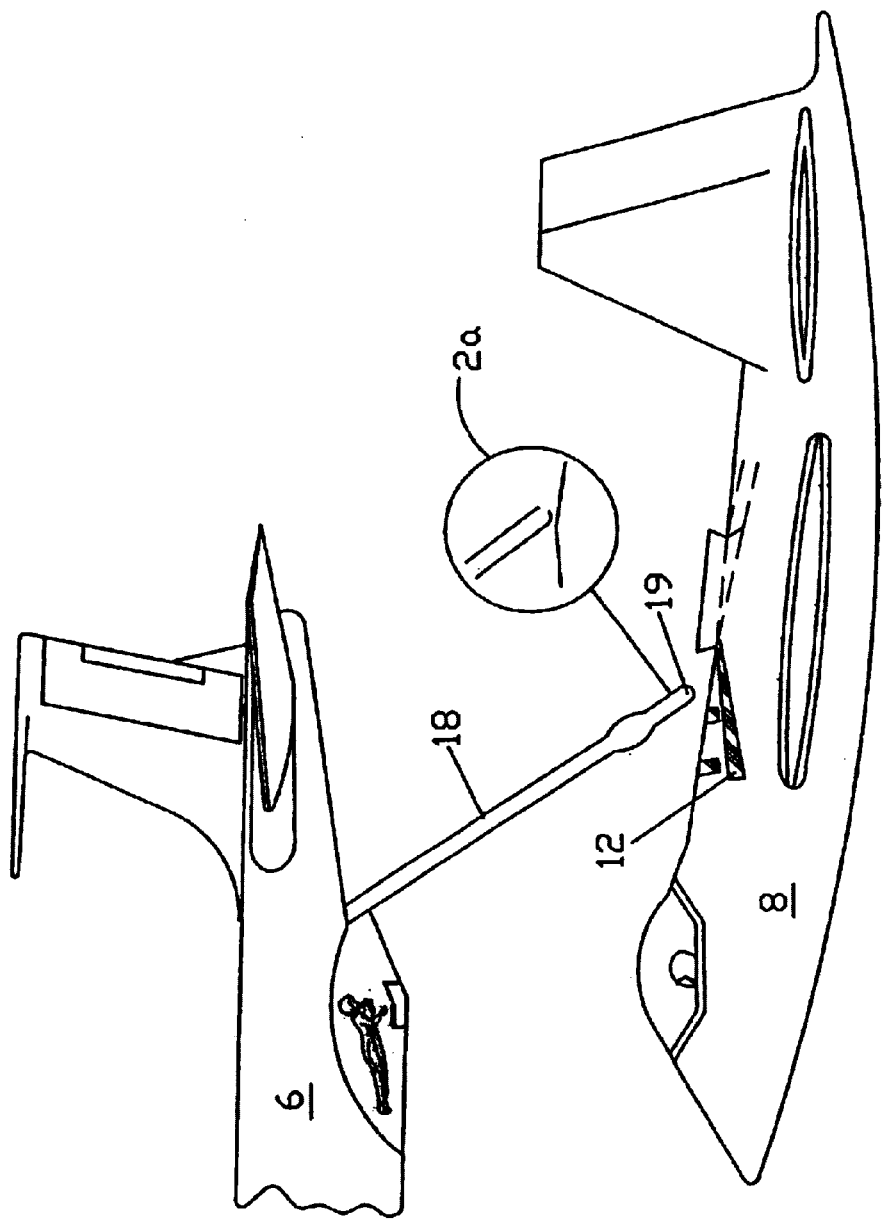
FIG. 2 is a fragmentary elevation schematic view, partly in section, of the fueling guide embodying the invention, in operation.
Figure 3:
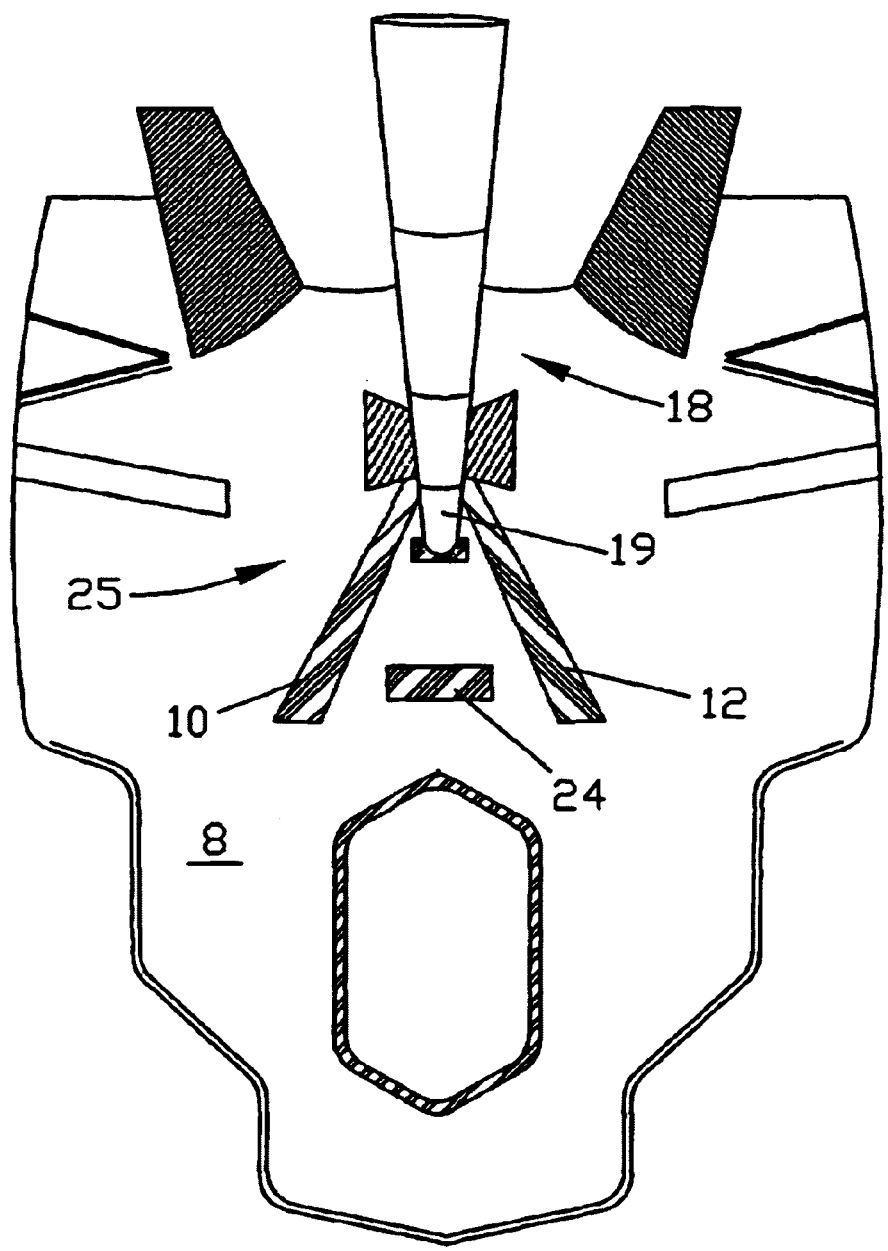
FIG. 3 is a fragmentary perspective schematic view of the refueling operation shown in FIG. 2.
Figure 6:
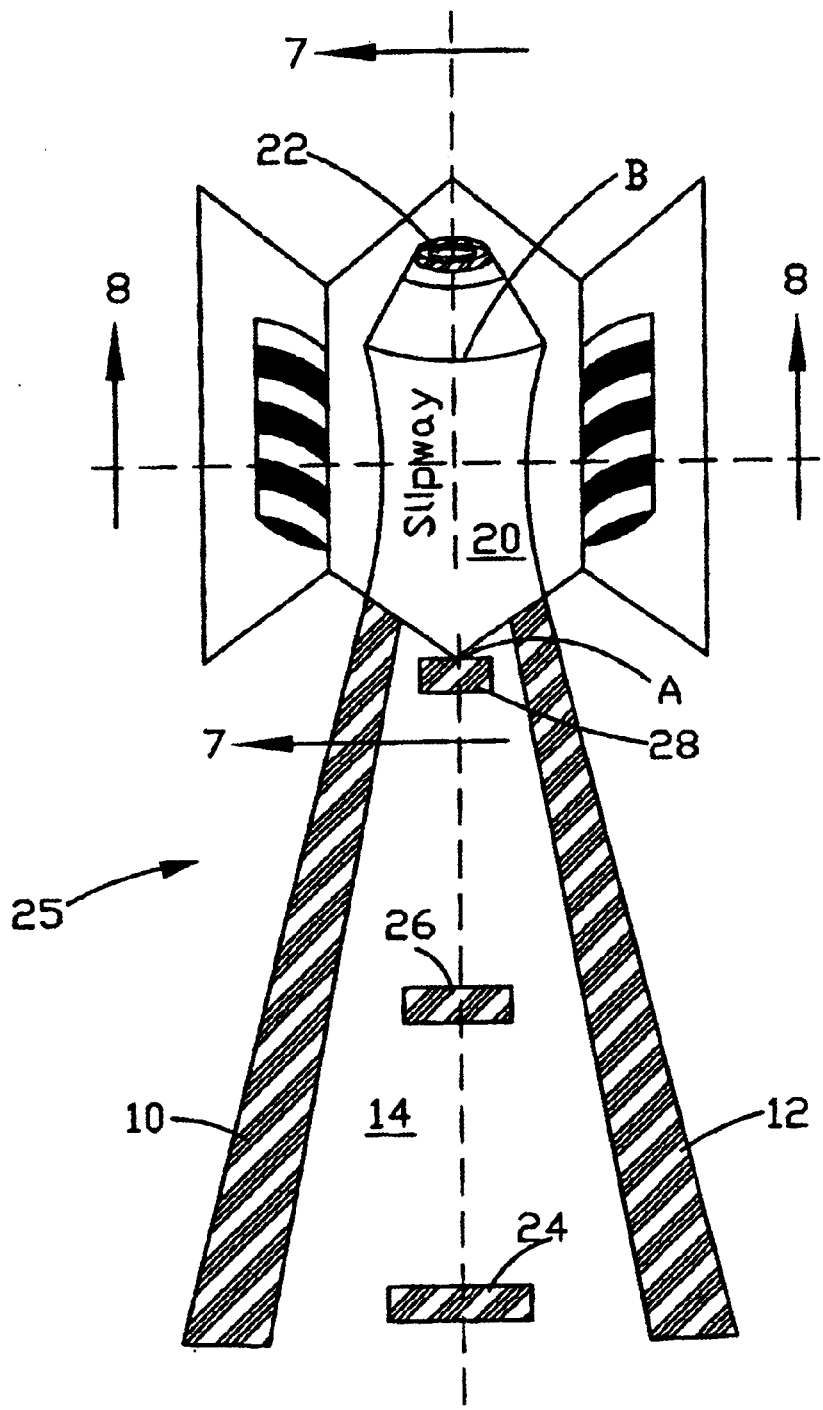
FIG. 6 is a fragmentary perspective schematic view of a refueling guide embodying the present invention.

As shown or indicated in FIGS. 2, 3 & 6, external lead-in lines are configured to form a visual pathway to the refueling-receptacle on the receiver aircraft. They include a pair of tapered lines 10 & 12, applied to the receiving aircraft surface 14, that converge at a location suitable for positioning a refueling boom nozzle 19 of known dimensions (on boom 18) into a receptacle or port 22 of known dimensions. These lines are tapered so that the right eye follows the right line and the left eye follows the left line with both lines being within the instantaneous field of view of the boom operator when the aircraft is within a reasonable refueling distance (less than 100 feet distant). The taper of these two lines 10 & 12 is designed to create a band or target of eye focus. The external (outboard) portion of both the right and left lines 12 & 10 describes an intersection point at the maximum distance allowable to effect a correct contact of the boom nozzle 19 with the receiver fuel receptacle or port 22. The inside taper of both lines is designed to provide a minimum range of depth for the boom nozzle to effect a contact, e.g., with the beginning of the slipway 20 at "A" shown in FIG. 6.

The taper of both lines 10 & 12 is designed to create the best visual image convergence when the boom is at the proper distance position for refueling.

This convergence of the right side lines and the left side lines (as a result of their size and taper) thus serves to create a target range (not just a singular focal point) in which the boom operator can effectively connect to the receiver aircraft without over extending or under extending the boom 18.

Also provided are marker bars 24, 26 & 28 which are applied to the aircraft surface laterally relative to the centerline of the aircraft, and are designed to provide depth as well as motion cues to the boom operator. They are set at a known distance from the target and are of a known size (thickness).

The marker bars 24, 26 & 28 are evenly spaced at, e.g., one-foot intervals. As each bar is passed over by the boom nozzle 19, the boom operator is provided with the knowledge that such nozzle has a set distance to go to effect contact. The marker bars also indicate the relative closure rate of the descending boom nozzle 19 to the slipway 20 and port 22, information that can be used to accelerate or retard the boom's movement, so as to affect a gentle contact with the slipway 20 and/or port 22.

Figure 4:
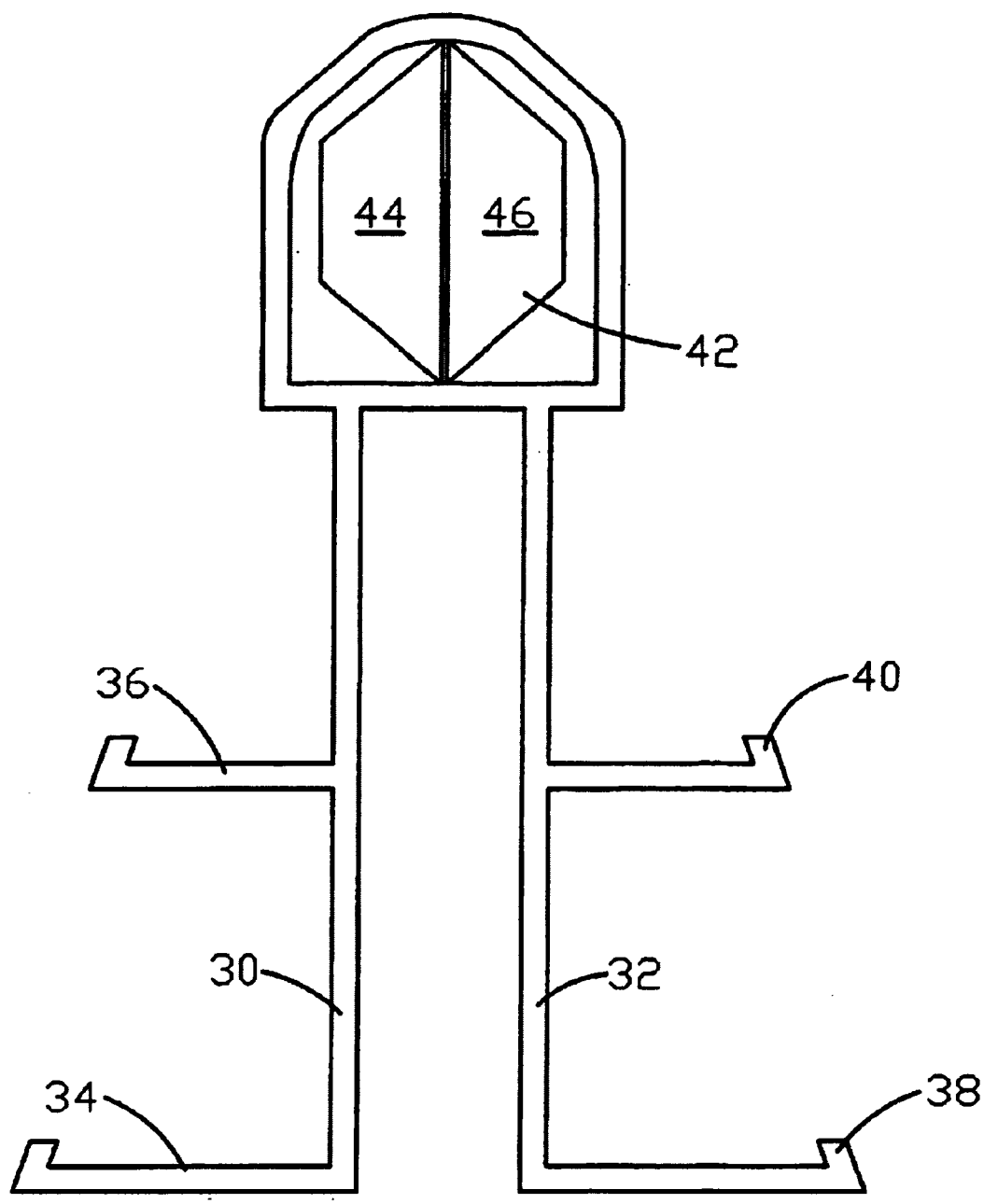
FIG. 4 is a schematic plan view of refueling guidelines according to the prior art.
Figure 5:
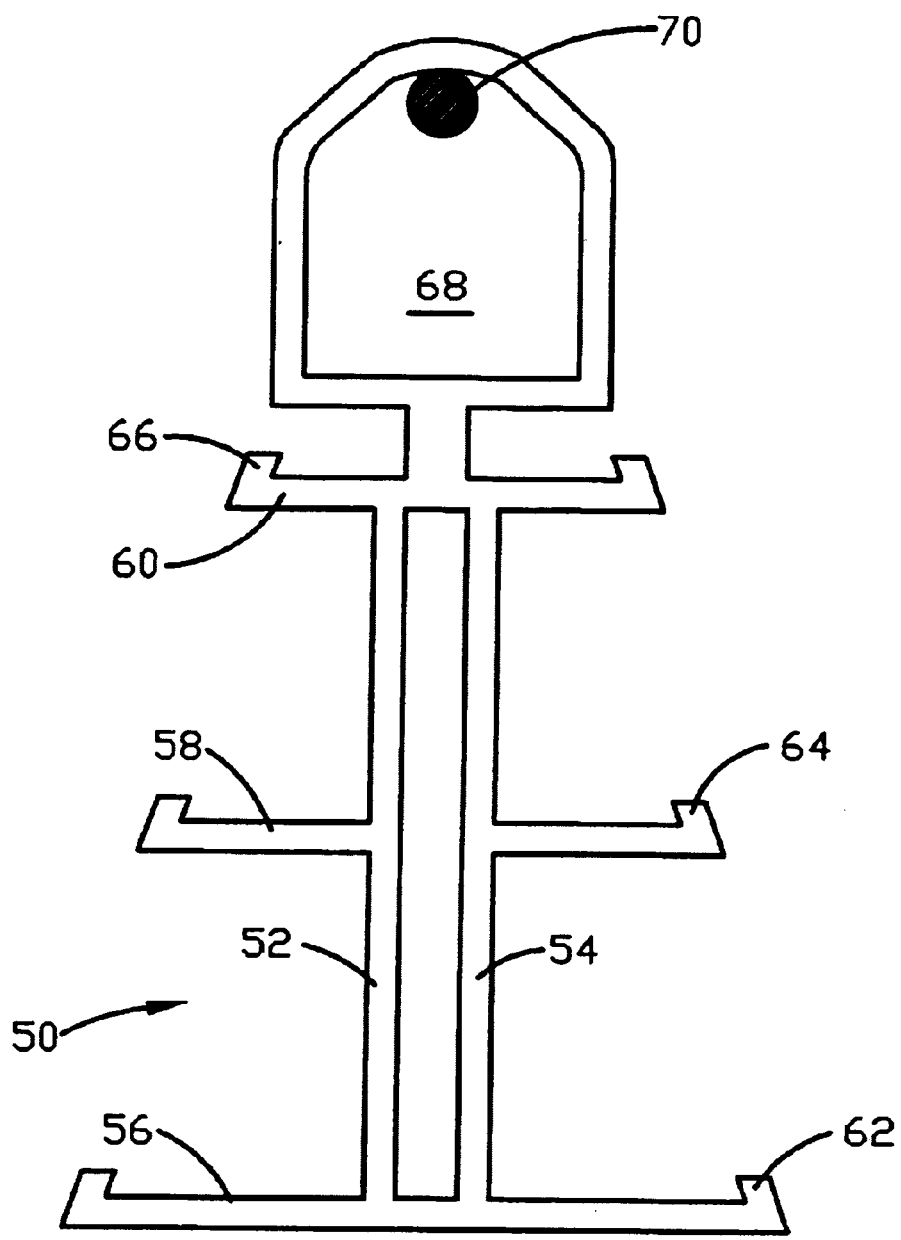
FIG. 5 is a schematic plan view of another set of refueling guidelines according to the prior art.

As noted previously, lead-in lines systems have used parallel lines with distance indicating lines terminating in hooks outside of the lead-in lines, as indicated in FIGS. 4 & 5 hereof. Thus in FIG. 4, lead-in lines 30 & 32 are parallel with outside distant lines 34 & 36 terminating in hooks 38 & 40, which lead-in lines 30 & 32 give the direction to fuel a recess 42, covered by closed recess doors 44 & 46, as shown.

Similarly, the guide way 50 of FIG. 5 has parallel lead-in lines 52 & 54, distance indicator lateral lines 56, 58 & 60 outside of the parallel lead-in lines 52 & 54, which lateral lines terminate in hooks respectively, 62, 64 & 66 and which lead-in lines 52 & 54 point generally in the direction of fuel recess 68 and fuel port 70, as shown in FIG. 5.

Figure 7:
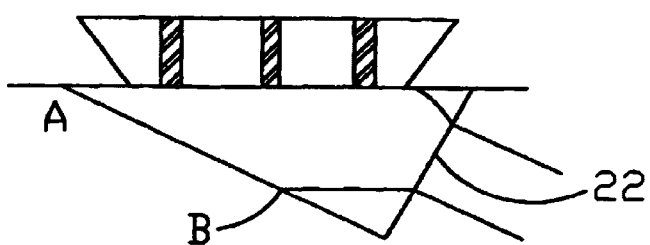
FIG. 7 is a fragmentary sectional elevation schematic view of part of the refueling guide of FIG. 6 taken on lines 7—7, looking in the direction of the arrows
Figure 8:
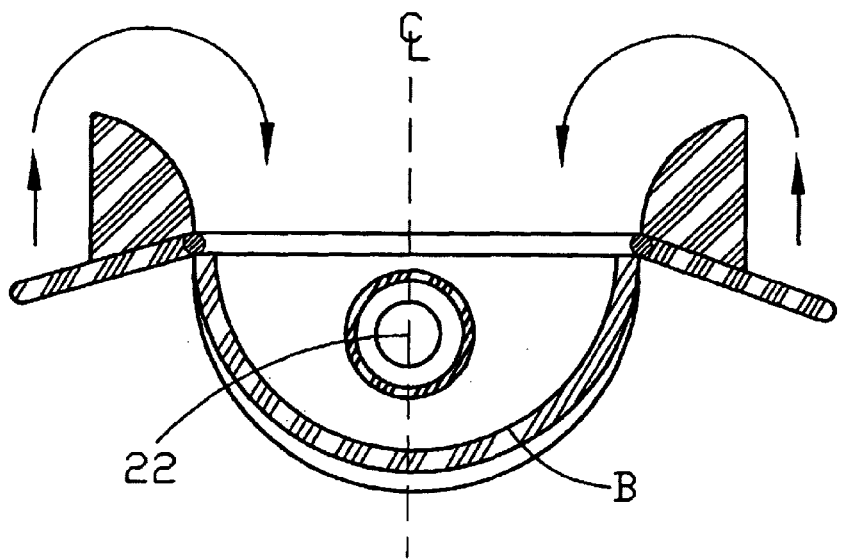
FIG. 8 is a fragmentary elevation schematic view of a part of the inventive refueling guide of FIG. 6 taken on lines 8—8, looking in the direction of the arrows.

The problem with the lead-in lines of FIGS. 4 & 5 is, while the respective parallel lead-in lines indicate the direction to the respective fuel ports, the distance to slipway and fuel port is vague because per FIG. 3 with the fuel boom 18 and its fuel nozzle 19 blocking the operator's view of slipway and port, parallel guidelines, per FIGS. 4 & 5, can not give the precise location of the beginning of the slipway and fuel port therebehind, which can cause the nozzle 19 to strike the aircraft surface 8, before arriving at such slipway and port such as slipway 68 and port 70 shown in FIG. 5; hence the advantage of the converging lead-in lines 10 & 12 with interior lateral bars 24, 26, & 28 therebetween, which closely indicate the distance the descending nozzle 19 has to travel to engage the reinforced slipway 20 and its associated port 22, as shown or indicated in FIGS. 6–8 hereof. That is, the guideway 25 of the invention provides the accurate information as to direction and distance to slipway and fuel port, though they be behind the descending boom 18 and nozzle 19 thanks to the multi visual cues of converging and tapering guidelines 10 & 12 and of lateral distance bars 24, 26, & 28 i.e. the guideway 25 of the invention shown, e.g., in FIGS. 3 & 6. That is, the multi visual cues provided by the guideway of the invention include those of direction, distance to go and rate of closure of nozzle to slipway and port.

Thus while the overall movement of each aircraft is controlled by its respective pilot, the boom operator is responsible for connecting the two aircraft safely and effectively, without causing collisions or damage to either aircraft. The boom operator controls the movement of the boom by hydraulic or aerodynamic means, through hand-operated controls, thus the boom operator requires accurate visual information or cues from the receiving aircraft to provide depth, distance and closure rate information in order to effect the hook-up without damaging either aircraft, the boom or the boom nozzle. The converging and tapering line pattern of the guideway of the present invention provides a visually more salient means to assist the boom operator in attaining a quick and effective refueling hook-up.

The guideway patterns of the invention thus create a focal range that is calculated to focus the boom operator's eyes on a segment of the receiver aircraft's refueling zone (the slipway) that is designed to take the force of the boom nozzle impact prior to the boom nozzle contacting the receptacle or port. The slipway area of contact is suitably reinforced to withstand the nozzle impact; other areas of the aircraft are not. Visual contrast is substantially enhanced by providing tapered lead-in lines. Depth perception is provided by using horizontal markings within the tapered converging lines; the boom operator can judge distance, as well as rate of movement of the boom relative to those markings. This effect allows the boomer to judge the rate of closure by comparing the movement of the boom to marks on the aircraft. That is, the present invention provides direction, depth, motion and distance visual cues to the tanker boom operators, allowing the tanker to receiver connection to be completed quickly and accurately.

The invention is a significant improvement in air-refueling lead-in line inventions. It provides quicker, more accurate visual cues to the air-refueling tanker boom operator, so that their acquisition and contact with receiver aircraft is safer and more effective than previous lead-in line systems. This invention is important for in-flight refueling in general, because it will reduce damages due to inadvertent boom strikes on receiver aircraft. These inadvertent strikes to unreinforced areas of the receiver aircraft have been due in part to a lack of proper visual cues available to the boom operator. This lack of cues can result in misjudged distance, depth and closure rates of refueling boom to receiver aircraft, which in turn cause collisions of the boom nozzle with unprotected aircraft structures. This invention addresses these problems by providing accurate visual cues to the boom operator on the tanker aircraft. This allows faster, more accurate contacts to be made between the two aircraft, with less damage potential.

This invention can be adapted to any aircraft capable of being refueled in flight, which has space available for air refueling lead-in lines. Possible uses for the invention include for any craft intended for in-flight refueling, including aircraft, present and future and unmanned aircraft as well as for spacecraft.

What is claimed is:

1. In an in-flight refueling system for an aircraft having a slipway leading to a fuel inlet port in a recess in said aircraft, the improvement comprising, a guideway having,
   a) a pair of lead-in lines on the surface of said aircraft which converge towards said slipway and port and
   b) a plurality of marks on said surface, spaced longitudinally between said lines a desired distance apart, so that said lines and marks aid in guiding a fuel boom and nozzle from a refueling aircraft to said slipway and port.

2. The guideway of claim 1 having said lines and marks forward of said slipway as the aircraft flies.

3. The guideway of claim 1 wherein said lead-in lines taper, as well as converge, in the direction of said slipway and port.

4. The guideway of claim 1 wherein the outer edges of said lead-in lines point towards said port at the far end of said slipway.

5. The guideway of claim 1 wherein the inner edges of said lead-in lines point toward the near end of said slipway.

6. The guideway of claim 1 wherein said marks are bars or dashes.

7. The guideway of claim 6 wherein said dashes or bars are mounted along a centerline between said lead-in lines.

8. The guideway of claim 7 wherein said dashes or bars are positioned laterally to said centerline.

9. The guideway of claim 8 wherein said dashes or bars are positioned orthagonally to said centerline.

10. The guideway of claim 1 wherein said recess is closed by a pair of doors which pivot toward each other on hinges, which doors when open, reveal padding over said hinges to protect them from contact with said nozzle.

11. The guideway of claim 1 wherein said lead-in lines are on the surface of the aircraft and are over two feet long and at least three of said marks are longitudinally spaced between said lead-in lines, which marks are about one foot apart.

12. The guideway of claim 1 wherein said lead-in lines which converge and said marks which are spaced between said lead-in lines, provide multi-visual cues as to distance, direction and rate of motion between said lead-in lines to said slipway and said port though one or both of them are obscured, at least in part, from the vision of the boom operator behind said boom and/or nozzle.

13. The guideway of claim 1 wherein said slipway and port are protected before and after refueling by a pair of hinged doors which pivot toward each other.

* * * * *